US005510191A

United States Patent [19]

Higashira et al.

[11] Patent Number: 5,510,191
[45] Date of Patent: Apr. 23, 1996

[54] NBR BASED RUBBER LAMINATED METAL PLATE GASKET MATERIAL

[75] Inventors: Toshihiro Higashira; Rikito Eguchi, both of Fujisawa, Japan

[73] Assignee: NOK Corporation, Tokyo, Japan

[21] Appl. No.: 219,477

[22] Filed: Mar. 29, 1994

[30] Foreign Application Priority Data

Apr. 2, 1993 [JP] Japan .................................. 5-100464

[51] Int. Cl.⁶ ....................... B65D 53/00; B32B 15/04; B32B 15/08; B32B 27/00

[52] U.S. Cl. ............... 428/457; 277/235 R; 428/460; 428/461; 428/463; 428/500; 428/520; 428/522; 428/920

[58] Field of Search ....................... 428/457, 406, 428/407, 460, 461, 463, 465, 492, 493, 500, 501, 506, 514, 515, 520, 524, 402, 522, 920; 277/227, 235 R

[56] References Cited

U.S. PATENT DOCUMENTS 4,491,621  1/1985  Okumoto et al. ..................... 428/519
4,988,548  1/1991  Takemura et al. ..................... 428/368
5,098,777  3/1992  Koli ..................................... 428/283
5,154,977  10/1992 Saito .................................... 428/457
5,286,574  2/1994  Foster .................................. 428/457
5,292,579  3/1994  Kitayama et al. ................... 428/283
5,298,539  3/1994  Singh et al. ........................... 524/92

FOREIGN PATENT DOCUMENTS 2-29484A  1/1990  Japan .
6033037   7/1992  Japan .

*Primary Examiner*—Paul J. Thibodeau
*Assistant Examiner*—Stephen Sand
*Attorney, Agent, or Firm*—Barnes & Thornburg

[57] ABSTRACT

A rubber-laminated metallic plate having a good resistance to an antifreezing fluid comprises a metallic plate, a primer layer comprising phenol resin and an NBR compound, formed on at least one side of the metallic plate, and a vulcanized rubber layer comprising the NBR compound, formed on the primer layer, where the NBR compound for forming the primer layer and the vulcanized rubber layer comprises NBR, at least 20% by weight of a white filler on the basis of the NBR, carbon black, zinc oxide and an organic peroxide.

6 Claims, No Drawings

NBR BASED RUBBER LAMINATED METAL PLATE GASKET MATERIAL

BACKGROUND OF THE INVENTION

1. FIELD OF THE INVENTION

The present invention relates to a rubber-laminated metallic plate, and more particularly to a rubber-laminated metallic plate having a good resistance to an antifreezing fluid and a good utility in gasket materials, etc.

2. DESCRIPTION OF THE PRIOR ART

JP-A-2-29484 discloses a process for producing a gasket material by forming a primer layer composed mainly of phenol resin on one side or both sides of a metallic plate and then forming a vulcanized rubber layer from a rubber solution comprising carboxyl group-containing NBR having a carboxy monomer content of 2 to 15% by weight, zinc peroxide and sulfur or a vulcanization accelerator thereon.

It is disclosed that the thus obtained gasker material has better rubber strength and bonding strength of the rubber layer to the primer layer without any occurrence of cracking or blister in the region exposed even to severe impact and friction conditions, and also has good heat resistance and scorch retardability because of use of the sulfer-zinc peroxide vulcanization system.

However, the gasket made from these materials still has such a problem as swelling of rubber and the resulting blister due to contact with an antifreezing fluid to cooling water, when applied as a gasker for engine heads, which are important gasket application sites. Particularly, when the gasket is half dipped in an antifreezing fluid at a higher temperature than 130° C., blisters occur in regions in contact with the fluid and its vapor within a short time such as about 70 to 500 hours, resulting in peeling of the rubber layer and the primer layer.

SUMMARY OF THE INVENTION

An object of the present invention is to provide a rubber-laminated metallic plate having a good resistance to an antifreezing fluid and a good utility in gasket materials, etc.

DETAILED DESCRIPTION OF THE INVENTION

According to the present invention, there is provided a rubber-laminated metallic plate, which comprises a metallic plate, a primer layer comprising phenol resin and a NBR (nitrile-butadiene rubber) compound, formed on at least one side of the metallic plate, and a vulcanized rubber layer comprising the NBR compound, formed on the primer layer. The NBR compound for use in the present invention as a component for forming the primer layer and the vulcanized rubber layer is a rubber compound comprising NBR, at least 20% by weight of a white filler on the basis of the NBR, carbon black, zinc oxide and an organic peroxide.

The metallic plate for used in the present invention includes, for example, a stainless steel plate, an SPCC steel plate, an aluminum plate, etc., whose surfaces have been toughened by shot blast, scotch blast, hairline finish, dull finish, or the like. These metallic plates are used after alkali degreasing treatment and then a treatment with a complex chromate comprising silica, a phosphate compound, trivalent chromium and hexavalent chromium to form an antirust film on the surfaces. In case of the SPCC steel plates, a zinc phosphate film or an iron phosphate film can be also formed on it. In case of application to gasket materials a metallic plate having a thickness of about 0.2 to about 0.8 mm can be used.

A primer is applied to one side or both sides of the metallic plate and heat treated at a temperature of about 150° C. to about 200° C. for abut 5 to about 30 minutes, thereby forming a primer layer having a thickness of about 1 to about 10 μm on one side. A primer prepared to a solid concentration of about 2 to about 10% by weight with a ketonic solvent such as methylethylketone, methylisobutylketone, diisobutylketone or the like, or with a ketone-alcohol mixed solvent comprises a phenol resin of cresol-novolak type, cresol-resol type, alkyl-modified type or the like as a main component (about 60 to about 80% by weight of all the solid matters), and a NBR compound comprising NBR, at least 20% by weight of a white filler on the basis of the NBR, carbon black, zinc oxide, an organic peroxide and various other compounding ingredients usually employed than these above. The phenol resin and the NBR compound are used in a ratio of the former to the latter of 6:4 to 8:2 by weight from the viewpoint of metal surface bonding property and bending processing property.

NBR for use in the present invention is usually those having a nitrile content of 28 to 42% by weight. NBR is used as a rubber compound. The rubber compound contains at least 20 by weight, preferably about 40 to about 120% by weight of a white filler on the basis of NBR, and further contains carbon black, zinc oxide and a usually employed organic peroxide as essential components. The white filler, which is used together with the carbon black as another filler, ia st least one of, for example, calcium silicate, calcium carbonate, silica, etc. Below 20% by weight of the white filler on the basis of NBR, occurrence of blisters and peeling cannot be prevented in the regions in contact with the antifreezing fluid and its vapor when half dipped in the antifreezing fluid. Carbon black is used in an amount of at least about 60% by weight, preferably about 70 to about 90% by weight, on the basis of NBR. Zinc oxide is used as an acid acceptor in an amount of about 3 to about 10% by weight on the basis of NBR.

A rubber solution prepared from the NBR compound is applied to the primer layer, dried at a temperature of about 60° C. to about 120° C. for about 5 to about 20 minutes to form an unvulcanized NBR rubber layer having a thickness of about 5 to about 120 μm on one side, and then press cured at a temperature of about 150° C. to about 230° C. and a pressure of about 50 to about 100 kgf/cm$^2$ for about 0.5 to about 30 minutes. The rubber solution for the application is adjusted to a solid concentration of about 20 to about 40% by weight and a viscosity of about 1,000 to about 5,000cps by kneading the respective components of the NBR compound in a kneader or the like and diluting the kneaded compound with a ketone solvent or a ketone-alcohol mixed solvent and an aromatic hydrocarbon solvent such as toluene, etc.

A dispersion of graphite powder, carbon black, paraffin wax, etc. as main components and a binder such as cellulose resin, acrylic resin, polybutadiene resin, etc. in a solvent such as toluene, etc. is applied to the resulting press cured layer to form a non-tacky layer having a thickness of about 2 to about 10 μm, thereby preventing seizure and adhesion. The present rubber-laminated metallic plate is quite free from occurrence of blisters and peeling in regions in contact with an antifreezing fluid and its vapor at an elevated temperature and thus can be effectively used as gasket materials such as gaskets for automobile cylinder heads, etc.

PREFERRED EMBODIMENTS OF THE INVENTION

The present invention will be described in detail below, referring to Examples and Comparative Examples.

EXAMPLE 1

The dull-finished surface of a stainless steel plate (SUS 301) having a thickness of 0.2 mm was subjected to an alkali degreasing treatment and then to a treatment with a complex chromate comprising silica, a phosphate compound, trivalent chromium and hexavalent chromium to form an antirust film on both sides. Then, a primer having the following composition (solid concentration: 5% by weight; phenol resin : NBR compound=7:3 by weight) was applied to the antirust film on both sides, and heated at 180° C. for 5 minutes to form a primer layer having a thickness of 2 μm each on both sides.

Primer composition:

| NBR compound | |
| --- | --- |
| NBR(nitrile content: 36% by weight) | 100 parts by weight |
| SRF carbon black | 80 parts by weight |
| White filler | |
| Calcium silicate | 40 parts by weight |
| Calcium carbonate | 40 parts by weight |
| Silica | 20 parts by weight |
| Zinc oxide | 5 parts by weight |
| Stearic acid | 2 parts by weight |
| Antioxidant (N-isopropyl-N'-phenyl-p-phenylenediamine) | 2 parts by weight |
| Triallyl isocyanurate | 2 parts by weight |
| 1,3-bis-t-butylperoxyisopropylbenzene | 2.5 parts by weight |
| Cresol-novolak type phenol resin (containing 3 phr of hexamethylenetetramine) | 682.7 parts by weight |
| Methylethylketone | 1853.8 parts by weight |

Then, a rubber solution (solid concentration: 25% by weight) prepared by mixing 293.5 parts by weight of the abovementioned NBR compound with 88.3 parts by weight of methylethylketone and 795.2 parts by weight of toluene was applied to the primer layer, dried at 60° C. for 15 minutes to form an unvulcanized NBR layer having a thickness of 25 μm each on both sides, and then press cured at 200° C. and 60 kgf/cm² for 10 minutes.

Then, a dispersion of polyethylene wax and a polybutadiene resin binder in toluene was applied to the vulcanized NBR layer on both sides and heated at 200° C. for 3 minutes to form a non-tacky layer having a thickness of 5 μm on both sides, thereby preventing the adhesion of the vulcanized rubber surfaces.

EXAMPLES 2 TO 4

Rubber-laminated metallic plates were prepared in the same manner as in Example 1, except that the white filler consisting only of the following one kind was used in place of the white fillers of Example 1:

80 parts by weight of calcium silicate (Example 2)
80 parts by weight of calcium carbonate (Example 3)
80 parts by weight of silica (Example 4)

The rubber-laminated metallic plates obtained in the foregoing Examples 1 to 4 were half dipped into an antifreezing fluid (Nissan Junsei long Life Coolant, trade name of a product made by Nissan Motors Co., Ltd., Japan) diluted with water to 50% by volume in a pressure vessel to investigate occurrence of blister and peeling in the regions in contact with the antifreezing fluid and its vapor. The results are given in the following Table 1.

TABLE 1

| Half dipping conditions | | Example 1 | | Examples 2 and 3 | | Example 4 | |
| --- | --- | --- | --- | --- | --- | --- | --- |
| Temp. (°C.) | Time (hrs) | Blister | Peeling | Blister | Peeling | Blister | Peeling |
| 130 | 70 | None | None | None | None | None | None |
|  | 140 | " | " | " | " | " | " |
|  | 240 | " | " | " | " | " | " |
|  | 500 | " | " | " | " | " | " |
| 150 | 70 | " | " | " | " | " | " |
|  | 140 | " | " | " | " | " | " |
|  | 240 | " | " | " | " | Very small | " |
|  | 500 | " | " | Very small | " | Very small | " |

COMPARATIVE EXAMPLES 1 TO 3

Rubber-laminated metallic plates were prepared in the same manner as in Example 1, except that an NBR compounds having the following compositions in parts by weight were used for the primer and the rubber composition in place of the NBR compound of Example 1:

|  | Comp. Ex.1 | Comp. Ex.2 | Comp. Ex.3 |
| --- | --- | --- | --- |
| NBR (nitrile content: 36% by weight) | 100 | 100 | 100 |
| SRF carbon black | 80 | 80 | 80 |
| White filler | | | |
| Calcium carbonate | 10 | — | 5 |
| Silica | — | 10 | 5 |
| Zinc oxide | 5 | 5 | 5 |
| Stearic acid | 2 | 2 | 2 |
| Antioxidant (N-isopropyl-N'-phenyl-p-phenylenediamine) | 2 | 2 | 2 |
| Triallyl isocyanurate | 2 | 2 | 2 |
| 1,3-bis-t-butylperoxyisopropylbenzene | 2.5 | 2.5 | 2.5 |

The rubber-laminated metallic plates obtained in these Comparative Examples 1 to 3 were subjected to half dipping tests in the antifreezing fluid in the same manner as in Examples 1 to 4. The results are shown in the following Table 2.

TABLE 2

| Half dipping conditions | | Comp. Ex. 1 | | Comp. Ex. 2 and 3 | |
|---|---|---|---|---|---|
| Temp. (°C.) | Time (hrs) | Blister | Peeling | Blister | Peeling |
| 130 | 70 | None | None | None | None |
|  | 140 | Very small | " | Large | Small |
|  | 240 | Large | Small | " | Large |
|  | 500 | " | Large | " | " |
| 150 | 70 | Very small | None | " | Small |
|  | 140 | Large | Small | " | Large |
|  | 240 | " | Large | " | " |
|  | 500 | " | " | " | " |

What is claimed is:

1. A rubber-laminated metallic plate, which comprises:

(a) a metallic plate;

(b) a primer layer comprising phenol resin and a nitrile-butadiene rubber compound, formed on at least one side of said metallic plate; and (c) a vulcanized rubber layer comprising said nitrile-butadiene rubber compound, formed on said primer layer, in which said nitrile-butadiene rubber compound used in forming said layers (b) and (c) comprises:

(i) nitrile-butadiene rubber, (ii) about 40 to about 120% by weight of a white filler on the basis of the nitrile-butadiene rubber, (iii) about 70 to about 90% by weight of a carbon black on the basis of the nitrile-butadiene rubber, (iv) about 3 to about 10% by weight of zinc oxide as an acid acceptor on the basis of the nitrile-butadiene rubber, and (v) a vulcanizing agent which consists of an organic peroxide.

2. A rubber-laminated metallic plate according to claim 1, wherein said white filler is selected from the group consisting of calcium silicate, calcium carbonate, silica, and mixtures thereof.

3. A rubber-laminated metallic plate according to claim 1, wherein the weight ratio of said phenol resin to said nitrile-butadiene rubber compound present in said primer layer (b) is from 6:4 to 8:2 by weight.

4. A rubber-laminated metallic plate according to claim 1, wherein a non-tacky layer is further provided on said vulcanized rubber layer.

5. A gasket material made of the rubber-laminated metallic plate according to claim 1.

6. A gasket material made of the rubber-laminated metallic plate according to claim 4.

* * * * *